United States Patent
Aaltonen et al.

(10) Patent No.: US 9,489,002 B2
(45) Date of Patent: Nov. 8, 2016

(54) PROVIDING POWER TO A COMPONENT

(75) Inventors: Markus Aaltonen, Turku (FI); Hannu Olavi Immonen, Tampere (FI); Rune Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 710 days.

(21) Appl. No.: 13/824,649

(22) PCT Filed: Sep. 20, 2010

(86) PCT No.: PCT/FI2010/050726
§ 371 (c)(1),
(2), (4) Date: Apr. 23, 2013

(87) PCT Pub. No.: WO2012/038579
PCT Pub. Date: Mar. 29, 2012

(65) Prior Publication Data
US 2013/0207624 A1    Aug. 15, 2013

(51) Int. Cl.
| | |
|---|---|
| *G05F 1/62* | (2006.01) |
| *H01M 10/44* | (2006.01) |
| *H01M 10/46* | (2006.01) |
| *H02J 7/00* | (2006.01) |
| *H01M 4/525* | (2010.01) |
| *H01M 4/58* | (2010.01) |
| *H01M 10/0525* | (2010.01) |

(52) U.S. Cl.
CPC ............. *G05F 1/62* (2013.01); *H01M 10/44* (2013.01); *H01M 10/46* (2013.01); *H02J 7/0065* (2013.01); *H01M 4/525* (2013.01); *H01M 4/5825* (2013.01); *H01M 10/0525* (2013.01)

(58) Field of Classification Search
CPC .......... G05F 1/62; G05F 1/575; G05F 1/263; H01M 10/44; H01M 10/46; H01M 10/633; H01M 10/0525; H01M 2/202; H01M 2/22; Y02E 60/12; Y02E 60/122; G05B 19/0423; H02J 7/0086; H02J 3/14; H02J 7/0065; H02M 3/156
See application file for complete search history.

(56) References Cited

U.S. PATENT DOCUMENTS

| | | | | |
|---|---|---|---|---|
| 6,118,248 | A | 9/2000 | Gartstein et al. | 320/107 |
| 6,178,572 | B1* | 1/2001 | Van Marcke | E03C 1/05 4/623 |
| 6,348,744 | B1* | 2/2002 | Levesque | H02J 7/0065 307/64 |
| 6,381,477 | B1* | 4/2002 | Johnson, Jr. | H04B 1/3816 379/322 |
| 6,735,105 | B2* | 5/2004 | Nakano | G06K 19/0701 365/226 |
| 7,912,441 | B2* | 3/2011 | Von Bosch | H04M 1/7253 455/343.1 |
| 8,150,339 | B2* | 4/2012 | Cassia | H03F 1/0244 455/118 |

(Continued)

FOREIGN PATENT DOCUMENTS

WO    WO 2009/076974 A1    6/2009

*Primary Examiner* — Jessica Han
*Assistant Examiner* — Demetries A Gibson
(74) *Attorney, Agent, or Firm* — Harrington & Smith

(57) ABSTRACT

Apparatus includes a first connection to a battery; a second connection to a component; a first path between the first and second connections including a non-upconverting voltage regulator and being absent of a voltage upconverter; a second path between the first and second connections including a voltage upconverter; and a controller. The controller is configured to determine a minimum operating voltage of the component; to determine whether a voltage provided at the first connection meets a predetermined relationship with respect to the minimum operating voltage of the component; and on a positive determination, to enable the first path and disable the second path, and on a negative determination, to disable the first path and enable the second path.

9 Claims, 2 Drawing Sheets

(56) References Cited

U.S. PATENT DOCUMENTS

| | | | | |
|---|---|---|---|---|
| 8,532,716 B2* | 9/2013 | Kim | ............... | H04W 52/0296 455/558 |
| 2009/0278506 A1* | 11/2009 | Winger | ............... | H02J 7/0068 320/160 |
| 2013/0009470 A1* | 1/2013 | Chuang | ............... | H02J 7/0065 307/31 |
| 2013/0154550 A1* | 6/2013 | Balmefrezol | ............ | G06F 1/263 320/107 |
| 2013/0259278 A1* | 10/2013 | Kill | ............... | H04R 25/602 381/318 |
| 2014/0015507 A1* | 1/2014 | Park | ............... | G05F 1/46 323/304 |
| 2014/0038675 A1* | 2/2014 | Khlat | ............... | H03F 1/0227 455/574 |

\* cited by examiner

PROVIDING POWER TO A COMPONENT

FIELD OF THE INVENTION

This invention relates to a method comprising providing power from a battery to a component. The invention relates also to apparatus comprising connecting a connection to a battery to a connection to a component. The invention relates also to software.

BACKGROUND

In order to connect a portable communications device, such as a mobile phone or laptop computer, to a cellular telephony network operating according to for example the GSM and UMTS standards, it is necessary for the device to include a subscriber identity module (SIM) card. SIM cards currently are implemented by universal integrated circuit cards (UICCs). SIM cards are standardised both in size and in the protocols that are used to transfer data to and from the SIM card. A UICC typically includes a CPU (central processing unit), ROM (read only memory), RAM (random access memory), EEPROM (electrically erasable programmable read only memory) and I/O (input/output) circuits. A UICC card will typically include storage of a few hundred kilobytes.

Originally, SIM cards required a supply voltage of 5 volts, although more commonly now the required supply voltage is 3 volts. Some SIM cards require a lower voltage of 1.8 volts.

Battery technology prevalent in mobile communication devices is Carbon-Lithium Cobalt Oxide (C—LiCoO2) battery technology. Batteries constructed using this technology have a discharge cut-off of around 3.1 volts. Since a SIM card needs to be operational in order for a mobile device to be able to communicate via a mobile telephone network, SIM cards are provided with battery power via a voltage upconverter, for instance a buck/boost converter.

SUMMARY

A first aspect of the invention provides a method comprising:
  determining a battery voltage;
  determining a minimum operating voltage of a component;
  determining whether the battery voltage meets a predetermined relationship with respect to the minimum operating voltage of the component; and
    on a positive determination, causing a connection from a battery to the component via a non-upconverting voltage regulator and absent of a voltage upconverter, and
    on a negative determination, causing a connection from the battery to the component via a voltage up converter.

The non-upconverting voltage regulator may be a low dropout regulator (LDO).

The voltage upconverter may be part of a buck/boost converter. On a positive determination, the method of the embodiments comprises causing a connection from the battery to the component via a non-upconverting voltage regulator and absent of a buck/boost converter.

The invention also provides a computer program, optionally stored on a medium, comprising machine readable instructions that when executed by computing apparatus control it to perform the method of any preceding claim.

Other embodiments are hardware implementations and others are software/hardware implementations.

A second aspect of the invention provides apparatus comprising:
  a first connection to a battery;
  a second connection to a component;
  a first path between the first and second connections including a non-upconverting voltage regulator and being absent of a voltage upconverter;
  a second path between the first and second connections including a voltage upconverter; and
  a controller configured:
    to determine a minimum operating voltage of the component;
    to determine whether a voltage provided at the first connection meets a predetermined relationship with respect to the minimum operating voltage of the component; and
      on a positive determination, to enable the first path and disable the second path, and
      on a negative determination, to disable the first path and enable the second path.

A third aspect of the invention provides apparatus comprising:
  a first connection to a battery;
  a second connection to a component;
  means for determining a minimum operating voltage of the component;
  means responsive to a determination that a voltage provided at the first connection meets a predetermined relationship with respect to the minimum operating voltage of the component to connect the first and second connections by a path including a non-upconverting voltage regulator and absent of a voltage upconverter; and
  means responsive to a determination that the voltage provided at the first connection does not meet the predetermined relationship with respect to the minimum operating voltage of the component to connect the first and second connections by a second path including a voltage upconverter.

A fourth aspect of the invention provides a module configured:
  to determine a minimum operating voltage of a component;
  to determine whether a battery voltage meets a predetermined relationship with respect to the minimum operating voltage of the component; and
    on a positive determination, to cause the battery voltage to be provided to the component by a first path including a non-upconverting voltage regulator and absent of a voltage upconverter, and
    on a negative determination, to cause the battery voltage to be provided to the component by a second path including a voltage upconverter. wherein the controller is configured to determine whether the battery voltage meets a predetermined relationship with respect to the minimum operating voltage of the component by determining whether the battery voltage exceeds a threshold that is greater than the minimum operating voltage of the component.

A fifth aspect of the invention provides apparatus, comprising:
  at least one processor; and
  at least one memory including computer program code;
    the at least one memory and the computer program code configured to, with the at least one processor, cause the apparatus at least to perform:
determining whether a battery voltage meets a predetermined relationship with respect to a minimum operating voltage of a component; and
on a positive determination, causing a connection from a battery to the component via a non-upconverting voltage regulator and absent of a voltage upconverter, and
on a negative determination, causing a connection from the battery to the component via a voltage up converter.

BRIEF DESCRIPTION OF THE DRAWINGS

Embodiments of the invention will now be described, by way of example only, with reference to accompanying drawings, in which.

DETAILED DESCRIPTION OF THE EMBODIMENTS

Figure 1:
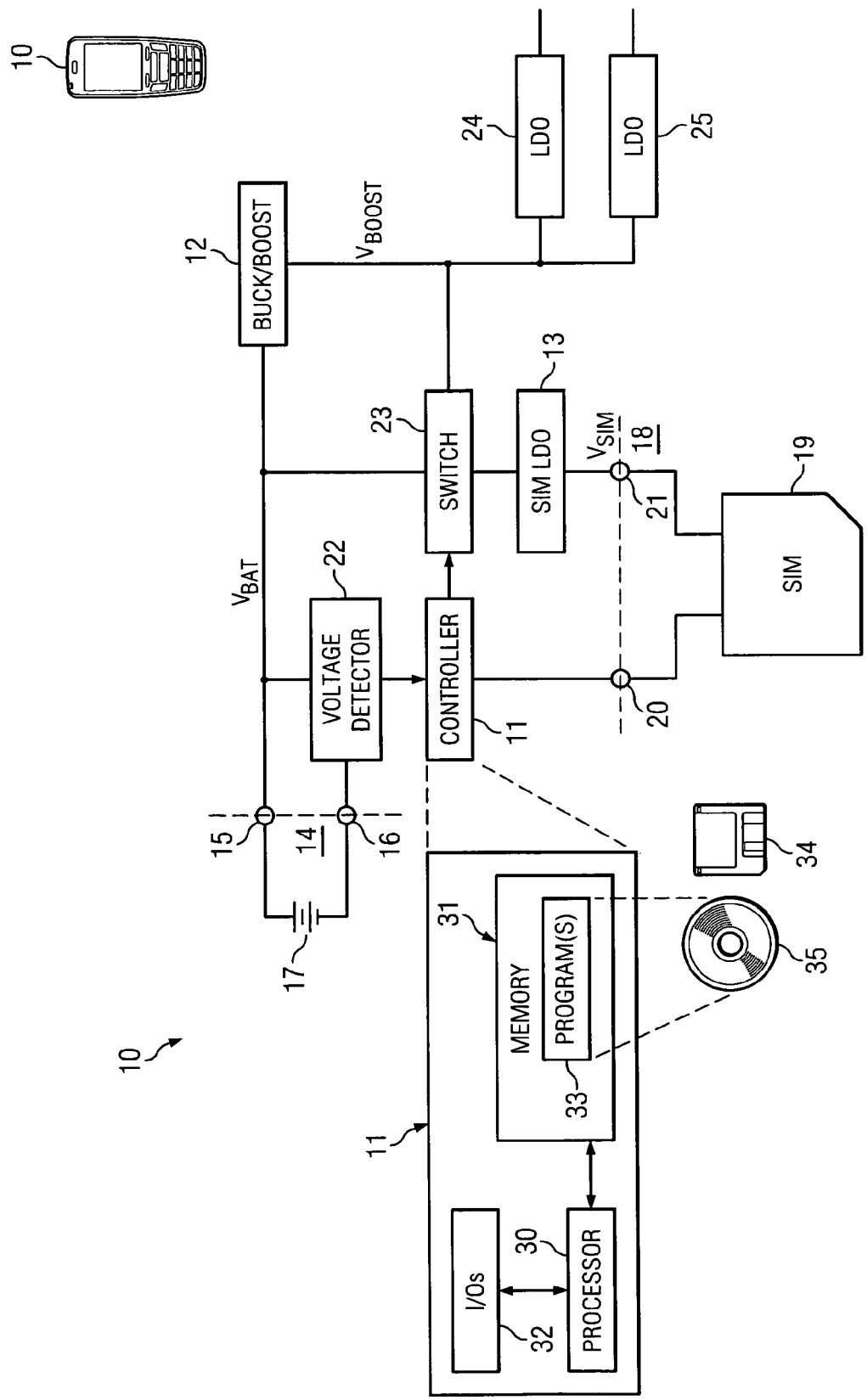
FIG. 1 is a schematic diagram of components forming part of a portable communications device embodying aspects of the invention.

FIG. 1 illustrates a mobile device 10 embodying aspects of the invention. The mobile device 10 is shown as a mobile telephone, particularly a smart phone or personal digital assistant (PDA). Alternatively, the mobile device 10 may be a laptop computer, a tablet computer or other device. The device includes numerous components which are omitted from the figure and the following description for the sake of conciseness and clarity.

Shown in FIG. 1 are key components of the device 10 including a controller 11, a buck/boost converter 12 and a SIM low drop-out regulator (LDO) 13. The device 10 includes a battery connection 14 that comprises a positive terminal 15 and a negative or ground terminal 16. A battery 17 is connected across the positive and negative terminals 15, 16. The battery 17 may be integrated fully with the device 10 or it may be removable and replaceable by a user or by a service engineer.

The mobile device 10 includes a connector 18 to a SIM card 19. The SIM connector 18 includes at least one data terminal 20 and at least one power terminal 21. In practice, plural terminals 21 are used to connect power between the device 10 and the SIM 19, and plural terminals 20 are used to transfer data between the device 10 and the SIM 19.

The device 10 also includes a voltage detection module 22, a switch 23 and first and second other LDOs 24, 25.

The voltage detector module 22 is connected across the positive and negative terminals 15, 16 of the battery connection 14. The voltage detector module is arranged to detect a voltage VBat that is provided by the battery 17. It will be appreciated that VBat at any given instant is dependent on a number of factors including the chemistry of the battery 17, the charge level of the battery, the instantaneous load and the battery temperature. The battery voltage VBat is provided as an input to the buck/boost converter 12 and to the switch 23.

As is conventional, the buck/boost converter 12 includes a buck (step-down) converter followed by a boost (step-up) converter. The buck/boost converter 12 is configured and controlled such as to provide a voltage VBoost that is suitable for powering relevant components of the device 10 whenever there is sufficient charge remaining in the battery 17 to power the device. At low values of VBat, the buck/boost converter 12 operates to upscale the battery voltage VBat and provide a voltage VBoost at an output. Here, the buck/boost converter 12 operates in boost mode and VBoost is greater than VBat. However, at relatively high values of VBat, the buck/boost converter 12 operates in buck mode and VBoost is less than VBat. The buck/boost converter 12 can be described as a voltage upconverter for two reasons: firstly because it is operable to upconvert a received Voltage, although it may not upconvert at all times, and secondly because it includes a voltage upconverter. Components (not shown) of the device 10 are provided with a voltage supply that is derived from VBoost by the first and second other LDOs 24, 25.

The switch 23 also is provided with VBoost at a second input. As such, the switch 23 receives VBat at a first input and VBoost at the second input. An output of the switch 23 is provided to an input of the SIM LDO 13. The power terminal 21 of the SIM connector 18 is connected to an output of the SIM LDO 13. As will be explained below, the connection of the SIM LDO 13 to the SIM 19 provides the SIM 19 with electrical power.

The data terminal 20 of the SIM connector 18 is connected to the controller 11. This allows the controller 11 to communicate with the SIM 19.

The controller 11 may take any suitable form. For instance, the controller 11 may comprise control logic, for instance in the form of hardware gates. Alternatively, the controller 11 may be, for example, programmable hardware with embedded firmware. For instance, the controller 11 may comprise a microprocessor arrangement, as shown in FIG. 1. Here, the controller 11 comprises a processor 30 that is connected to a memory 31 and to input/outputs 32. The memory is provided with one or more computer programs 33. The one or more programs 33 include instructions that when executed by the process control it to perform a method of controlling the switch 23, and thus controlling operation of the device 10, based on decisions made using information received from the voltage detecting module 22 and the SIM 19. This is explained in more detail below, particularly with reference to FIG. 2. The computer program instructions 33 may arrive at the controller 11 via an electromagnetic carrier signal or be copied from a physical entity such as a computer program product or memory device 34 or a record medium such as a CD-ROM or DVD 35.

Figure 2:
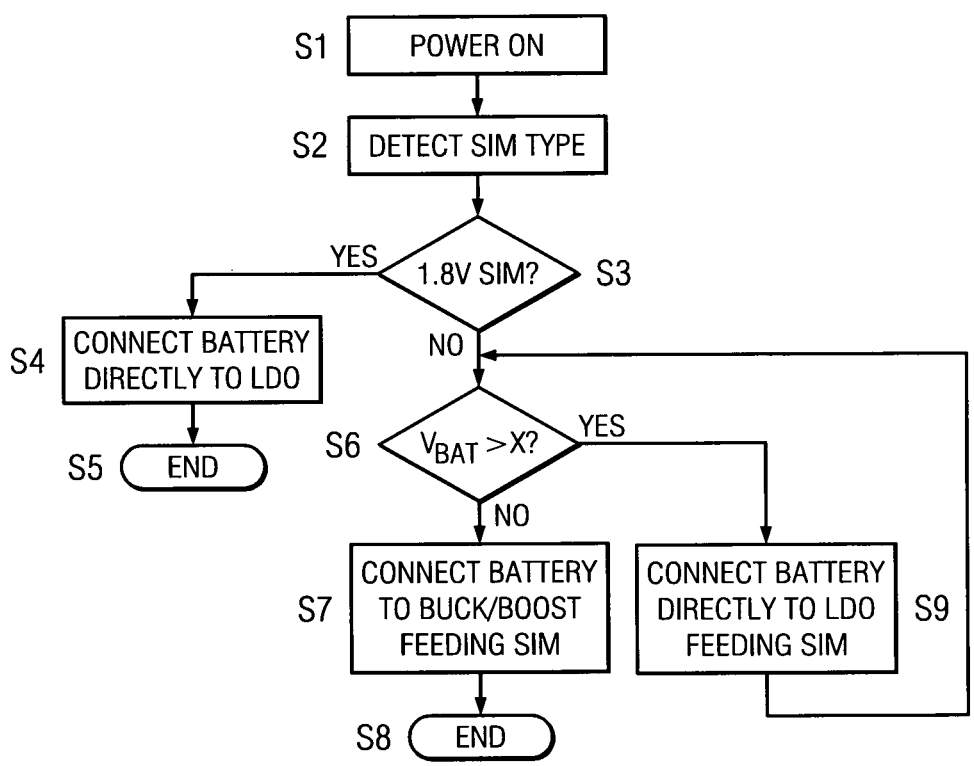
FIG. 2 is a flowchart illustrating operation of the FIG. 1 device according to certain aspects of the invention.

FIG. 2 is a flowchart illustrating operation of the device, particularly the controller 11.

The operation of FIG. 2 starts at step S1 when the device 10 is powered up. At step S2, the type of the SIM 19 is detected. This is achieved by the controller 11 sending a request for information about the SIM type to the SIM 19 via the data connector 20 of the SIM connector 18. The SIM 19 responds to the request with information from which the controller 11 can determine the type of SIM. The SIM type may be represented as a minimum operating voltage of the SIM 19 or in any other suitable manner from which the controller 11 can determine the minimum operating voltage of the SIM. For instance, the information from which the controller 11 can determine the type of SIM may be information identifying a class of device, or a model number.

At step S3, the controller 11 determines whether the SIM 19 is a 1.8 volt SIM. Put generically, step S3 involves the controller 11 determining whether the SIM 19 is of a predetermined type. On a positive determination, the operation proceeds to step S4. Here, the controller connects the battery 17 directly to the SIM LDO 13. This is achieved by the controller 11 controlling the switch 23 to connect VBat to the SIM LDO 13 and to isolate VBoost from the SIM LDO. After step S4, the operation ends at step S5.

In the event of a negative determination from step S3, operation proceeds to step S6. Here, VBat is compared to a threshold voltage X. The threshold voltage X is predetermined and stored in the controller 11, for instance in the memory 31. In these example embodiments, the threshold voltage X is equal to 3 volts plus an amount that is equal to or slightly greater than the operational voltage drop across the SIM LDO 13. If VBat is greater than threshold voltage X, it can be assumed that VBat is sufficiently high to result in a voltage being provided to the SIM 19 that is sufficient to power the SIM 19. If the threshold voltage X is not exceeded by VBat, it can be assumed that the battery voltage VBat may not be sufficiently high to power the SIM 19. In the event of a negative outcome from step S6, operation proceeds to step S7. Here, the controller causes the battery 17 to be connected to the SIM 19 via the buck/boost converter 12. This occurs by the controller 11 controlling the switch 23 to disconnect VBat from the SIM LDO 13 and instead to connect VBoost to the SIM LDO. Since VBoost is higher than VBat, step S7 results in the SIM 19 being provided with a voltage that is sufficient to power the SIM. After step S7, the operation ends at step S8.

If step S6 yields a positive result, the operation proceeds to step S9. Here, the controller connects the battery 17 directly to the SIM LDO 13 without incorporating the buck/boost converter 12. This is achieved by the controller 11 controlling the switch 23 to connect VBat directly to the SIM LDO 13 and to isolate VBoost. Step S9 is similar to step S4 in this regard. After step S9, the operation proceeds again to the input of step S6.

The controller 11, the voltage detector 22, the switch 23, the SIM LDO 13 and the buck/boost converter 12 may be provided as part of a single integrated circuit (IC). This IC may be provided on a printed wire board (PWB) along with the battery connectors 14. Alternatively, the battery connectors 14 may be provided on a PWB that is separate to a board or substrate on which the IC is mounted. The SIM connectors 20, 21 may be connected to the same PWB as the battery connectors 14, or they may be provided on a separate PWB.

Execution of the method shown by the flowchart of FIG. 2 results in operation of the mobile device that is advantageous for a number of reasons.

In the event of the SIM 19 being a 1.8 volt SIM 19, the SIM is powered directly from the battery 17, not utilising the buck/boost converter 12. This mode of operation results also when it is determined that VBat is sufficiently high to provide the minimum voltage required of a 3 volt SIM 19, after allowing for a voltage drop across the SIM LDO 13. In this mode of operation, i.e. where the buck/boost converter 12 is excluded from the connection between the battery 17 and the SIM 19, power consumption of the device 10 is reduced because inefficiencies resulting from using the buck/boost converter 12 to provide a voltage to the SIM are avoided. Although the buck/boost converter 12 may still be utilised to provide voltages to the other LDOs 24 and 25, the power drawn by the buck/boost converter 12 is less and so overall operating efficiency is improved. If, however, VBat is not sufficient to power the SIM 19, after taking account of the voltage drop across the SIM LDO 13, the buck/boost converter 12 is utilised to ensure that a sufficiently high voltage is provided to the power input 21 of the SIM 19 and thus ensure operation of the SIM 19. This allows the SIM 19 to be powered even with low levels of charge remaining in the battery.

Features of the device 10 described above allow the buck/boost converter 12 to be omitted from the path between the battery 17 and the SIM for much of the voltage curve of a C—LiCoO2 battery. With such batteries, VBat is likely to fall bellow the threshold voltage X only for a relatively small portion of the end of the voltage curve, i.e. when there is relatively little charge remaining in the battery. As such, improved efficiency can result across almost all of the discharge period of the battery, although the buck/boost converter 12 is used for a time at the end of the period.

Features of the invention described above provide performance advantages also with other battery types. For instance, a battery of the type having chemistry Carbon-Lithium Iron Phosphate (C—LiFePO4) have a voltage curve that has a maximum of approximately 3.6 volts and a discharge cut-off voltage of approximately 2.8 volts. With such a voltage curve, VBat is sufficient to power a 3 volt SIM 19 without utilising the buck/boost converter 12 for a significant proportion of the discharge period, although the proportion is less than it is for C—LiCoO2 batteries.

In the event of a detection that the SIM 19 is a low voltage SIM, for instance a 1.8 volt SIM, the battery voltage VBat can be provided to power the SIM 19 without involving the buck/boost converter 12 as long as the voltage VBat is sufficient to power the device 10.

The above has been described with reference to 1.8 volt and 3 volt SIM cards. However, it will be appreciated that the invention is not limited to such. Other embodiments of the invention incorporate the ability to provide SIM cards with different minimum voltage requirements with electrical power. This applies particularly to SIM cards with minimum voltages having values that are not in common use at the time of writing this patent specification.

Other embodiments of the invention utilise the features described above to provide electrical power to components other than SIM cards. In these embodiments, a minimum operating voltage of the component is detected in any suitable way, using software, hardware or a combination of software and hardware, and a voltage upconverter is utilised in the provision of electrical power to the component only if a voltage provided directly by a battery is not sufficient to meet the minimum voltage requirement of the component, taking into account voltage drops across any component(s) in the path between the battery and the component. In these other embodiments, the features described above provide electrical power to phone or laptop components or peripherals such as a display, memory, a camera, a CWS devices such as a Bluetooth module etc.

It should be realized that the foregoing example embodiments should not be construed as limiting. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:
1. A method comprising:
a controller of apparatus comprising: a first connection to a battery; a second connection to an external subscriber identity module card; a first path between the first and second connections including a non-upconverting voltage regulator and being absent of any voltage upcon- verter; and a second path between the first and second connections including a voltage upconverter, performing a method comprising:

determining a battery voltage of the battery connected at the first connection;

sending a request for information, where the request for information is about the subscriber identity module card, and where the request for information is sent to the subscriber identity module card via the second connection;

determining from information received from the subscriber identity module card a minimum operating voltage of the subscriber identity module card;

determining whether the battery voltage meets a predetermined relationship with respect to the minimum operating voltage of the subscriber identity module card;

on a positive determination, enabling the first path and disabling the second path, and on a negative determination, disabling the first path and enabling the second path;

wherein determining a minimum operating voltage of the subscriber identity module card comprises determining a type of the subscriber identity module card, and the method further comprises responding to determining that the subscriber identity module card is a 1.8V type subscriber identity module card by causing the connection from the battery to the subscriber identity module card via the non-upconverting voltage regulator and without a voltage upconverter.

2. A method as claimed in claim 1, wherein the type indicates whether the card is a 3V type card or a 1.8V type subscriber identity module card.

3. A method as claimed in claim 1, wherein determining whether the battery voltage meets a predetermined relationship with respect to the minimum operating voltage of the subscriber identity module card comprises comparing the battery voltage to a threshold that is greater than the minimum operating voltage of the subscriber identity module card.

4. A computer program, optionally stored on a medium, comprising machine readable instructions that when executed by computing apparatus control it to perform the method of claim 1.

5. Apparatus comprising:
a first connection to a battery;
a second connection to an external subscriber identity module card;
a first path between the first and second connections including a non-unconverting voltage regulator and being absent of any voltage upconverter;
a second path between the first and second connections including a voltage upconverter; and
a controller configured:
to send a request for information, where the request for information is about the subscriber identity module card, and where the request for information is sent to the subscriber identity module card via the second connection;
to determine from information received from the subscriber identity module card a minimum operating voltage of the subscriber identity module card;
to determine whether a voltage provided at the first connection meets a predetermined relationship with respect to the minimum operating voltage of the subscriber identity module card; and
on a positive determination, to enable the first path and disable the second path, and
on a negative determination, to disable the first path and enable the second path;
wherein the controller is configured to determine the minimum operating voltage of the subscriber identity module card by determining a type of the subscriber identity module card; and to respond to a determination that the subscriber identity module card is a 1.8V type subscriber identity module card by causing the connection from the battery to the subscriber identity module card via the non-unconverting voltage regulator and without any voltage upconverter.

6. Apparatus as claimed in claim 5, wherein the type indicates whether the card is a 3V type card or a 1.8V type card.

7. Apparatus as claimed in claim 5, wherein the controller is configured to determine whether the battery voltage meets a predetermined relationship with respect to the minimum operating voltage of the subscriber identity module card by determining whether the battery voltage exceeds a threshold that is greater than the minimum operating voltage of the subscriber identity module card.

8. A portable communications device, for instance a mobile telephone, comprising apparatus as claimed in claim 5.

9. Apparatus comprising:
a first connection to a battery;
a second connection to an external subscriber identity module card;
a first path between the first and second connections including a non-unconverting voltage regulator and being absent of any voltage upconverter;
a second path between the first and second connections including a voltage upconverter; and a controller configured:
to send a request for information, where the request for information is about the subscriber identity module card, and where the request for information is sent to the subscriber identity module card via the second connection;
to determine from information received from the subscriber identity module card a minimum operating voltage of the subscriber identity module card;
to determine whether a voltage provided at the first connection meets a predetermined relationship with respect to the minimum operating voltage of the subscriber identity module card;
on a positive determination, to enable the first path and disable the second path, and
on a negative determination, to disable the first path and enable the second path;
to respond to a determination that the voltage provided at the first connection exceeds a threshold that is higher than the minimum operating voltage of the external subscriber identity module card to connect the first and second connections by the path including the non-upconverting voltage regulator and absent of any voltage upconverter; and
to respond to a determination that the voltage provided at the first connection does not exceed the threshold to connect the first and second connections by the second path including the voltage upconverter.

* * * * *

UNITED STATES PATENT AND TRADEMARK OFFICE
CERTIFICATE OF CORRECTION

PATENT NO. : 9,489,002 B2
APPLICATION NO. : 13/824649
DATED : November 8, 2016
INVENTOR(S) : Markus Aaltonen et al.

Page 1 of 1

It is certified that error appears in the above-identified patent and that said Letters Patent is hereby corrected as shown below:

In the Claims

In Claim 5:
Column 8, Line 14, "non-unconverting" should be deleted and -- non-upconverting -- should be inserted.

In Claim 9:
Column 8, Line 33, "non-unconverting" should be deleted and -- non-upconverting -- should be inserted.

Signed and Sealed this
Tenth Day of January, 2017

Michelle K. Lee
*Director of the United States Patent and Trademark Office*